United States Patent
Yokouchi

(10) Patent No.: US 7,613,340 B2
(45) Date of Patent: Nov. 3, 2009

(54) IMAGE PROCESSING METHOD, IMAGE PROCESSOR, AND PROGRAM FOR CAUSING A COMPUTER TO EXECUTE THE PROCESSING METHOD

(75) Inventor: Kouji Yokouchi, Kaisei-machi (JP)

(73) Assignee: Fujifilm Corporation, Tokyo (JP)

( * ) Notice: Subject to any disclaimer, the term of this patent is extended or adjusted under 35 U.S.C. 154(b) by 711 days.

(21) Appl. No.: 10/669,718

(22) Filed: Sep. 25, 2003

(65) Prior Publication Data

US 2005/0175256 A1 Aug. 11, 2005

(30) Foreign Application Priority Data

Sep. 27, 2002 (JP) .............. 2002-283889

(51) Int. Cl.
*G06K 9/00* (2006.01)
(52) U.S. Cl. ...................... 382/164; 382/171
(58) Field of Classification Search ................ 382/284, 382/190, 266, 282, 307, 163–167
See application file for complete search history.

(56) References Cited

U.S. PATENT DOCUMENTS

| | | | | |
|---|---|---|---|---|
| 5,594,850 A | * | 1/1997 | Noyama et al. | 345/632 |
| 5,982,381 A | * | 11/1999 | Joshi et al. | 345/629 |
| 6,035,060 A | * | 3/2000 | Chen et al. | 382/164 |
| 6,141,442 A | * | 10/2000 | Chen | 382/166 |
| 6,977,754 B2 | | 12/2005 | Matsumoto et al. | |
| 7,115,060 B2 | * | 10/2006 | Gumpoltsberger | 475/276 |
| 7,119,924 B2 | * | 10/2006 | Prabhakar et al. | 358/1.9 |
| 7,194,134 B2 | * | 3/2007 | Bradshaw | 382/226 |
| 7,212,687 B2 | * | 5/2007 | Ohshima | 382/284 |

FOREIGN PATENT DOCUMENTS

| | | | |
|---|---|---|---|
| EP | 0924648 A2 | * | 12/1998 |
| EP | 924648 A2 | * | 6/1999 |
| JP | 10028221 A | * | 1/1998 |
| JP | 2000-222564 A | | 8/2000 |
| JP | 2000-222564 | * | 11/2000 |
| JP | 2002-222564 | * | 11/2000 |
| JP | 2001-202504 A | | 7/2001 |
| JP | 2001-358929 A | | 12/2001 |

* cited by examiner

*Primary Examiner*—Brian P. Werner
*Assistant Examiner*—Jayesh Patel
(74) *Attorney, Agent, or Firm*—Birch, Stewart, Kolasch & Birch, LLP

(57) ABSTRACT

A method of performing image processing on an image synthesized from a natural image and a computer graphic (CG) image. In this method, the synthesized image is separated into a natural-image region and a CG-image region. Based on the natural-image region, an image-processing parameter for the image processing is computed. Next, an intermediate image is acquired by performing the image processing on the synthesized image, based on the image-processing parameter. And a processed image is acquired by synthesizing the natural-image region contained in the intermediate image and the CG-image region contained in the synthesized image.

20 Claims, 4 Drawing Sheets

IMAGE PROCESSING METHOD, IMAGE PROCESSOR, AND PROGRAM FOR CAUSING A COMPUTER TO EXECUTE THE PROCESSING METHOD

This nonprovisional application claims priority under 35 U.S.C. § 119(a) on Patent Application No(s). 2002-283889 filed in JAPAN on Sep. 27, 2002, which is(are) herein incorporated by reference.

BACKGROUND OF THE INVENTION

1. Field of the Invention

The present invention relates to an image processing method and image processor that perform image processing on a synthesized image obtained by synthesizing a natural image acquired by photography and a computer graphic (CG) image such as clip art contained in a template, and to a program for causing a computer to execute the image processing method.

2. Description of the Related Art

In photo studios, there is service for making, for example, New Year's cards illustrated with photographs, by utilizing a template that consists of New Year's characters, illustrations, and a blank region for inserting photographs. Such New Year's cards are made by, for example, synthesizing image data obtained by reading out an image recorded on a negative film or obtained with a digital camera, and template data representing a template containing clip art or characters produced by computer processing, and then printing a synthesized image on the basis of the synthesized image data.

Besides photo studios, a synthesized image can also be made by synthesizing an image obtained by a user and a template by an application program for synthesizing and editing images installed in personal computers. This enables users to make post cards easily.

To enhance the picture quality of an image reproduced by printing out image data, an image-processing parameter for image processing, such as a density correction process, a color correction process, a gradation correction process, etc., is computed based on image data, and based on the computed image-processing parameter, image processing is performed on the image data. The image processing renders it possible to obtain a reproduced image with a high picture quality.

Also, by performing image processing on an image obtained by synthesizing an image (natural image) obtained by photographing and a template, a synthesized image with a high picture quality can be obtained.

In the case where a synthesized image that a user obtained with an application program is printed in a photo studio at user's request, an image-processing parameter for image processing is computed from the synthesized image, and image processing is performed on the synthesized image. However, since such a synthesized image contains both a natural image and a computer graphic (CG) image such as clip art contained in a template, the original color and brightness of the CG image will vary if image processing is performed on the synthesized image by the computed image-processing parameter. Also, because a CG image frequently contains primary colors compared to a natural image, the picture quality of a natural image will be degraded if image processing is performed by an image-processing parameter computed from a synthesized image containing a CG image.

SUMMARY OF THE INVENTION

The present invention has been made in view of the circumstances described above. Accordingly, it is an object of the present invention to provide an image processing method and image processor which are capable of performing suitable image processing on an image synthesized from a natural image and a CG image. Another object of the invention is to provide a program for causing a computer to execute the image processing method.

To achieve the above-described objects, there is provided a method of performing image processing on an image synthesized from a natural image and a computer graphic (CG) image. The method comprises (a) a step of separating the synthesized image into a natural-image region and a CG-image region; (b) a step of computing an image-processing parameter for the image processing, based on the natural-image region; (c) a step of acquiring an intermediate image by performing the image processing on the synthesized image, based on the image-processing parameter; and (d) a step of acquiring a processed image by synthesizing the natural-image region contained in the intermediate image and the CG-image region contained in the synthesized image.

In the image processing method of the present invention, a boundary portion between the natural-image region and CG-image region contained in the synthesized image may be blurred and then the CG-image region in the synthesized image and the natural-image region in the intermediate image may be synthesized.

In accordance with the present invention, there is provided an image processor for performing image processing on an image synthesized from a natural image and a computer graphic (CG) image. The image processor comprises (1) separation means for separating the synthesized image into a natural-image region and a CG-image region; (2) parameter computation means for computing an image-processing parameter for the image processing, based on the natural-image region; (3) processing means for acquiring an intermediate image by performing the image processing on the synthesized image, based on the image-processing parameter; and (4) synthesis means for acquiring a processed image by synthesizing the natural-image region contained in the intermediate image and the CG-image region contained in the synthesized image.

In the image processor of the present invention, the synthesis means may blur a boundary portion between the natural-image region and CG-image region contained in the synthesized image and then synthesize the CG-image region in the synthesized image and the natural-image region in the intermediate image.

Note that the image processing method of the present invention may be provided as a program that is carried out by a computer. The program may be provided on a computer readable recording medium.

According to the present invention, a synthesized image is separated into a natural-image region and a CG-image region, and based on the natural-image region, an image-processing parameter for image processing is computed. Next, an intermediate image is acquired by performing the image processing on the synthesized image, based on the image-processing parameter. And a processed image is acquired by synthesizing the natural-image region contained in the intermediate image and the CG-image region contained in the unprocessed synthesized image. Since the image-processing parameter is computed based on the natural-image region contained in the synthesized image, suitable image processing is performed on a natural-image contained in the intermediate image. Therefore, a natural image contained in the processed image can have a high picture quality.

On the other hand, the original color and brightness of the CG image contained in the intermediate image have varied due to image processing, but the processed image is obtained by synthesizing the unprocessed CG-image region in the synthesized image and the processed natural-image region in the intermediate image. Therefore, in the natural-image region, the natural image is able to have a high picture quality, and in the CG-image region, the processed image is able to maintain the picture quality of the original design.

Also, according to the present invention, a boundary portion between the natural-image region and CG-image region contained in the synthesized image is blurred and then the CG-image region in the synthesized image and the natural-image region in the intermediate image are synthesized. Therefore, there is no possibility that the boundary portion between a natural image and a CG image contained in the processed image will look unnatural. This enables the processed image to have a natural impression.

BRIEF DESCRIPTION OF THE DRAWINGS

The present invention will be described in further detail with reference to the accompanying drawings wherein.

DESCRIPTION OF THE PREFERRED EMBODIMENT

Figure 1:
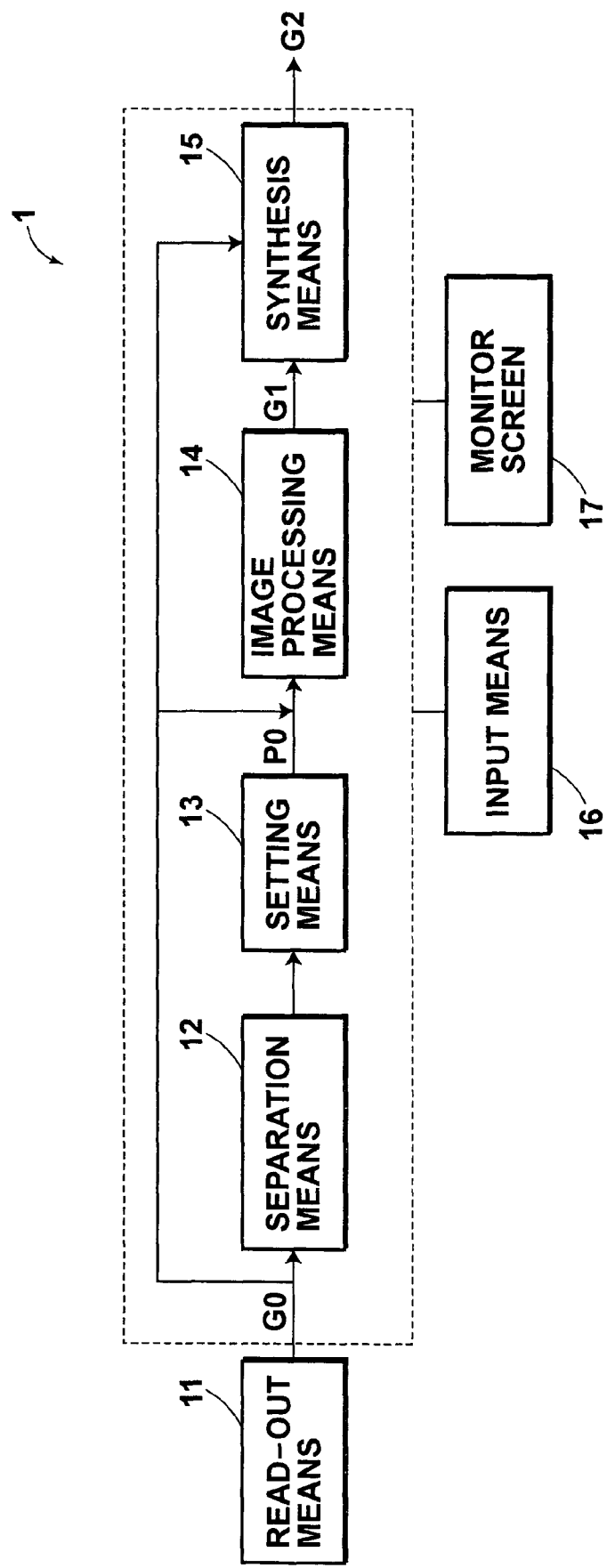
FIG. 1 is an schematic block diagram showing an image processor constructed in accordance with a preferred embodiment of the present invention.

Referring now to FIG. 1, there is shown an image processor 1 constructed in accordance with a preferred embodiment of the present invention. As shown in the figure, the image processor 1 is equipped with read-out means 11, separation means 12, setting means 13, image processing means 14, synthesis means 15, a monitor screen 17 for performing various displays, and input means 16 consisting of a keyboard and a mouse. The read-out means 11 reads out synthesized image data G0 from a storage medium such as a CD-R, a DVD-R, a hard disk, a memory card, etc. The synthesized image data G0 represents a synthesized image (also denoted by reference character G0), which consists of a natural image, and a computer graphic (CG) image stored on a storage medium. The separation means 12 separates the synthesized image G0 into the region of a natural image and the region of a CG image. The setting means 13 computes an image-processing parameter P0 for performing image processing on the synthesized image data G0, as will be described later. The image processing means 14 acquires intermediate image data G1 (G1 also denotes an intermediate image) by performing image processing on the synthesized image data G0, based on the image-processing parameter P0. The synthesis means 15 acquires final image data G2 (G2 also denotes a final image) by synthesizing the region of a natural image contained in the intermediate image G1, and the region of a CG image contained in the unprocessed synthesized image G0.

The read-out means 11 consists of a media drive, a card reader, etc., depending on the type of storage medium that is used.

Figure 2:
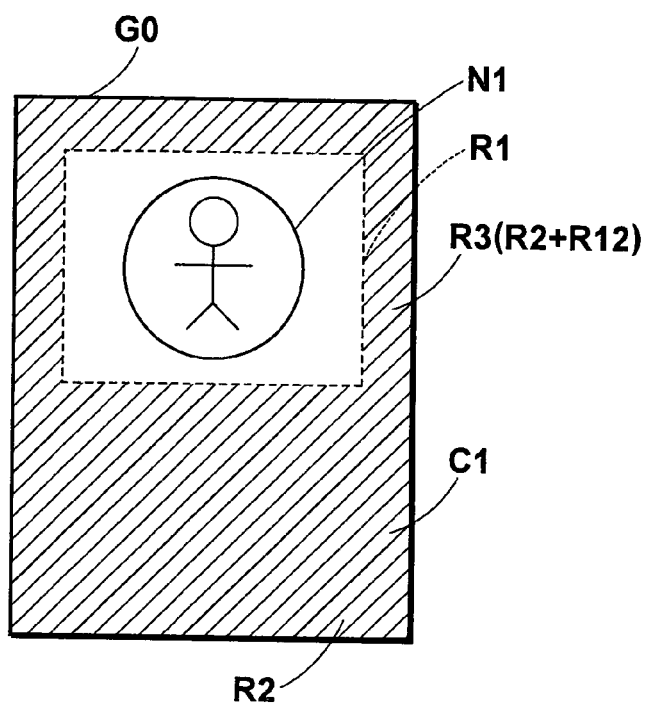
FIG. 2 is a diagram used to explain how a natural-image region is specified.

The separation means 12 first displays synthesized image data G0 on the monitor screen 17, and then receives the specification of a natural-image region contained in the synthesized image G0, performed by a user. FIG. 2 shows how the natural-image region is specified. As illustrated in the figure, if synthesized image G0, which consists of a circular natural-image region N1 and a CG-image region C1 other than the natural-image region N1, is displayed on the monitor screen 17, the user specifies a rectangular region R1 containing the natural-image region N1 with the input means 16, as shown by a broken line in FIG. 2. In this way, the synthesized image G0 is separated into a region R1 and a region R2 (shaded portion) other than the region R1.

The separation means 12 extracts a pixel having the same color as the color of pixels contained in the region R2, from all pixels within the region R1. Next, the separation means 12 judges that pixels having the same color as the color of pixels contained in the region R2, among all pixels within the region R1, are CG-image pixels, and also judges the remaining pixels to be natural-image pixels.

Figure 3:
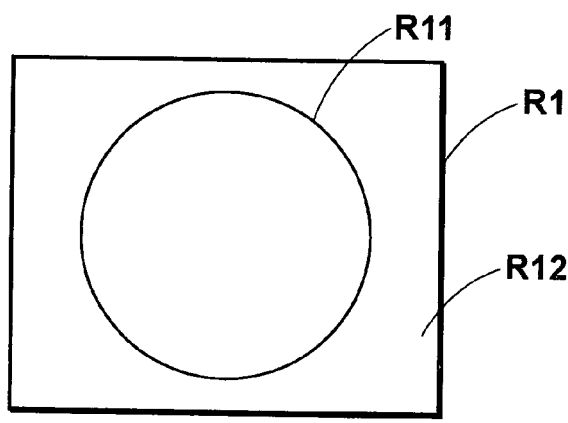
FIG. 3 is a diagram used to explain how a natural-image region and a CG-image region are separated.

As illustrated in FIG. 3, the separation means 12 separates the region R1 into a region R11 corresponding to a natural image and a region R12 corresponding to a CG image, by extracting pixels that have the same color as the color of pixels contained in the region R2, from all pixels within the region R1. In this manner, the synthesized image G0 is separated into the region R11 corresponding to a natural image and the region corresponding to a CG image (hereinafter referred to as R3). The region R3 consists of regions R2 and R12. If region separation is accurately performed, then the region R11 will correspond to the natural-image region N1 and the region R3 will correspond to CG-image regions R2 and R12.

Figure 4:
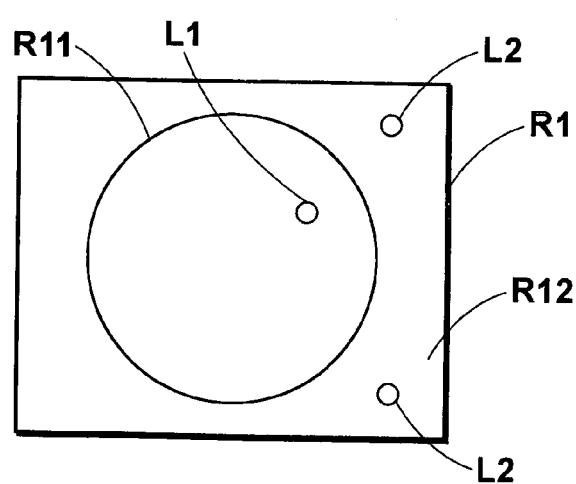
FIG. 4 is a diagram used to explain how natural-image regions are separated from CG-image regions.

As illustrated in FIG. 4, there are cases where the region R11 corresponding to a natural image within the region R1 contains a small region L1 consisting of a pixel having the same color as the color of pixels contained in the region R2. Conversely, there are cases where the region R12 corresponding to a CG image within the region R1 contains small regions L2 consisting of a pixel not having the same color as the color of pixels contained in the region R2. In such a case, the size of the small regions L1, L2 is compared with a predetermined threshold value. When they are greater than or equal to the threshold value, it is judged that the small region L1 is a CG image contained in a natural image and that the small region L2 is a natural image contained in a CG image. In this way, the natural-image region R11 and CG-image region R12 are determined.

On the other hand, when the size of the small region L1 or L2 is less than the threshold value, it is judged to be noise. In this case, the small region L1 within the region R11 is contained in the region R11 corresponding to a natural image. Conversely, the small region L2 within the region R12 is contained in the region R12 corresponding to a CG image.

Note that the separation of the natural-image region R11 and CG-image region R12 may be displayed on the monitor screen 17 so it can be corrected with the input means 16.

Figure 5:
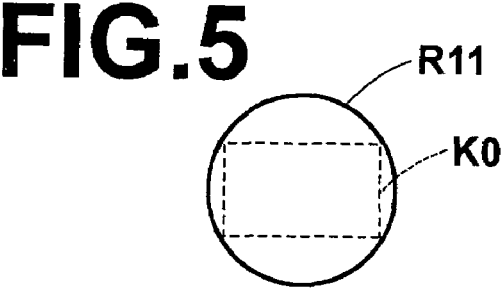
FIG. 5 is a diagram used for explaining how a maximum rectangular region is set.

As shown in FIG. 5, the setting means 13 sets a maximum rectangular region K0 that is inscribed in the circular region R11 corresponding to a natural image extracted by the separation means 12. And based on the synthesized image data G0 within the set maximum rectangular region K0, the setting means 13 computes an image-processing parameter P0 for performing image processing, such as a density correction process, a color correction process, a gradation correction process, etc., on the synthesized image data G0.

The image processing means 14 acquires intermediate image data G1 by performing image processing on the synthesized image data G0, based on the image-processing parameter P0 computed in the setting means 13.

The synthesis means 15 generates mask image data, and performs a filtering process on the mask image data, using a low-pass filter. The mask image data represents a mask image that causes the value of the region R3 corresponding to a CG image to be 255 (synthesized image data G0 in the preferred embodiment is represented by 8 bits) and the value of the region R11 corresponding to a natural image to be 0.

Figure 6:
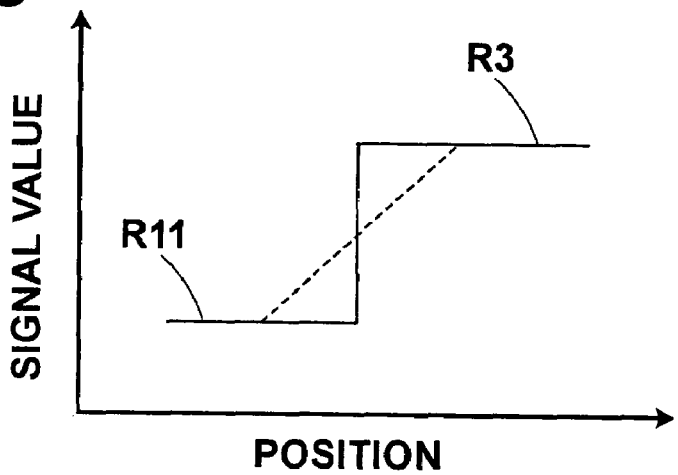
FIG. 6 is a diagram for explaining how a mask portion with a value of 255 is reduced after a filtering process.

FIG. 6 depicts how a filtering process is performed in the vicinity of the boundary between the region R3 and region R11 by a low-pass filter. In the vicinity of the boundary between the regions R3 and R11, if a filtering process is performed on the mask image data by a low-pass filter, the values of signals near the boundary vary smoothly as shown by a broken line in FIG. 6.

However, in the mask image after the filtering process, a mask portion with a value of 255 is reduced within the region R3 corresponding to a CG image. As a result, the boundary portion of a CG image will blur when synthesizing a region corresponding to a natural image contained in the intermediate image G1 and a region corresponding to a CG image contained in the synthesized image data G0, as will be described later.

Figure 7:
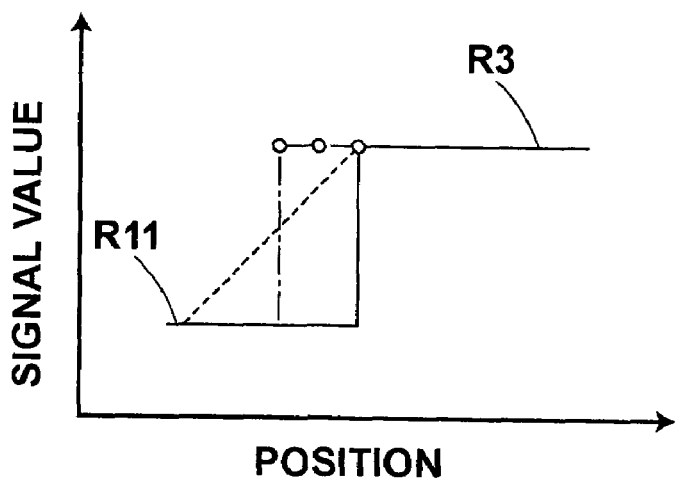
FIG. 7 is a diagram for explaining how a mask portion with a value of 255 is prevented from being reduced after a filtering process.

Because of this, the synthesis means 15, as depicted in FIG. 7, widens a region where a value in a mask image has 255, in accordance with the filter size of a low-pass filter, and then acquires filtered mask image data by performing a filtering process on the mask image data with a low-pass filter. In the case of a low-pass filter having a filter size of 5×5, if a region where a value in a mask image is 255 is widened by the amount corresponding to 2 pixels, filtered mask image data can be obtained without reducing a mask portion that has a value of 255 after a filtering process.

The synthesis means 15 acquires processed image data (final image data) G2 that represents a processed image (final image), by synthesizing the synthesized image data G0 and intermediate image data G1, based on the filtered mask image data. The synthesis is performed by the following Eq. 1:

$$G2(x, y) = \frac{M(x, y)}{255} \cdot G0(x, y) + \frac{255 - M(x, y)}{255} \cdot G1(x, y) \quad (1)$$

in which (x, y) is the position of a pixel on an image represented by synthesized image data G0, G1, or G2, and M is the filtered mask image data.

Figure 8:
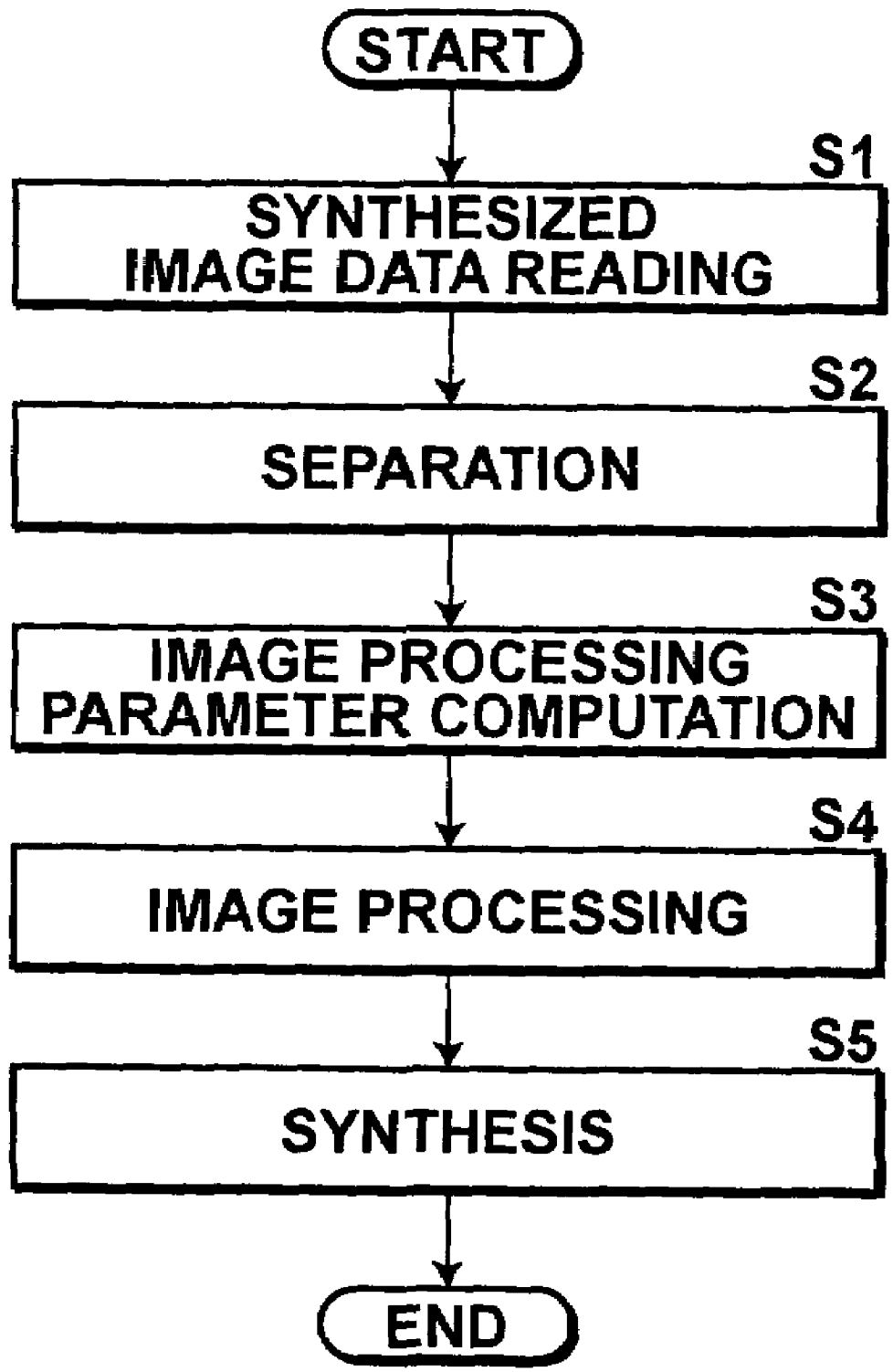
FIG. 8 is a flowchart showing the essential steps that are performed in the preferred embodiment of the present invention.

Now, a description will be given of operation of the preferred embodiment. FIG. 8 shows the essential steps that are performed in the preferred embodiment. Initially, the read-out means 11 reads out synthesized image data G0 from a storage medium (step S1). Then, the separation means 12 separates the synthesized image data G0 into a natural-image region R11 and a CG-image region R3 (step S2).

Next, based on the synthesized image data G0 within the region R11 corresponding to a natural image, the setting means 13 computes an image-processing parameter P0 (step S3). And the image processing means 14 acquires intermediate image data G1 by performing image processing on the synthesized image data G0, based on the image-processing parameter P0 (step S4) Next, the synthesis means 15 acquires processed image data (final image data) G2 representing a processed image (final image) G2 by synthesizing the synthesized image data G0 and intermediate image data G1, based on filtered mask image data, as indicated in the above-described Eq. 1 (step S5). The processed image data G2 is printed out by a printer.

Thus, in the preferred embodiment of the present invention, a processed region N2 corresponding to a natural image and an unprocessed region C2 corresponding to a CG image are synthesized into a processed image (final image) G2. Since the image-processing parameter P0 is computed based on the synthesized image data G0 within the region R11 corresponding to the natural-image region N1 contained in the synthesized image G0, suitable image processing is performed on a natural image contained in the intermediate image G1. Therefore, a natural image contained in the intermediate image G1 can have a high picture quality.

On the other hand, the original color and brightness of a CG image contained in the intermediate image G1 have varied due to the above-described image processing, but the processed image (final image) G2 is obtained by synthesizing a region C2 corresponding to the CG image C1 contained in the unprocessed image G0, and the natural-image region N2 contained in the intermediate image G1. Therefore, in the natural-image region, the natural image can have a high picture quality, and in the CG-image region, the processed image G2 has maintained the picture quality of the original design.

In addition, the region C2 corresponding to a CG image is obtained by performing a mask process on the synthesized image G0 by filtered mask image data, so the circumference of the region C2 corresponding to a CG image blurs. Therefore, there is no possibility that the boundary portion between the natural image and CG image contained in the processed image G2 will look unnatural. This enables the processed image G2 to have a natural impression.

In the preferred embodiment of the present invention, although the maximum rectangular region K0 is set within the region R11, and the image-processing parameter P0 is computed based on the synthesized image data G0 within the maximum rectangular region K0, the image-processing parameter P0 may be computed based on the synthesized image data G0 within the region R11.

Also, in the preferred embodiment of the present invention, although the synthesized image G0 is separated into the region R11 corresponding to a natural image and the region R3 corresponding to a CG image, users may confirm the region R11 and region R3 by displaying them on the monitor screen 17 after separation. In this case, it is preferable to be able to reset the separated region R11 and region R3 manually with the input means 16.

The image processing method of the present invention may be provided as a program that causes a computer to execute the image processing method. The program may be recorded on a computer readable recording medium. A skilled artisan would know that computer readable recording media are not limited to any specific type of storage device and may be any type of device, including but not limited to: CD's. floppy disks, RAM's, ROM's, hard disks, magnetic tapes, and devices for storing internet downloads, in which computer instructions can be stored. Transmission of computer code through a network or through wireless transmission means is also within the scope of this invention. Additionally, computer code/instructions include, but are not limited to: source, object and executable code, and may be in any language, including highest level languages, assembly language, and machine language.

While the present invention has been described with reference to the preferred embodiment thereof, the invention is not to be limited to the details given herein, but may be modified within the scope of the invention hereinafter claimed.

What is claimed is:

1. A method of performing image processing on an image synthesized from a natural image and a computer graphic (CG) image that has a single color, said method comprising:
   utilizing a computer processor to perform the steps of:
   receiving via a computer input device designation of a region containing a natural-image region in the synthesized image;
   temporarily dividing the designated region into the natural-image region and a CG-image region by extracting from the designated region pixels that have the same color as the color contained in a region of the synthesized image other than the designated region, wherein
   when a first small region composed of pixels having the same color as the color contained in the region other than the designated region is present in the designated region if the size of the first small region is greater than or equal to a threshold value, the first small region is extracted from the designated region to be classified as part of the CG-image region, and
   when a second small region composed of pixels having a color different from the color contained in the region other than the designated region is present in the designated region if the size of the second small region is greater than or equal to the threshold value, the second small region is not extracted from the designated region and is to be classified as part of the natural-image region;
   dividing said synthesized image into the natural-image region and the CG-image region;
   computing an image-processing parameter for said image processing, based on said natural-image region;
   acquiring an intermediate image by performing said image processing on said synthesized image, based on said image-processing parameter; and
   acquiring a processed image by synthesizing said natural-image region contained in said intermediate image and said CG-image region contained in said synthesized image.

2. The method as set forth in claim 1, wherein a boundary portion between said natural-image region and CG-image region contained in said synthesized image is blurred and then said CG-image region in said synthesized image and said natural-image region in said intermediate image are synthesized.

3. The method as set forth in claim 1, wherein said synthesized image is obtained by reading out synthesized image data from a storage medium.

4. The method as set forth in claim 1, wherein said divided natural image and CG image are displayed.

5. The method as set forth in claim 1, wherein a maximum rectangular region that is inscribed in said natural-image region is set; and said image-processing parameter is computed based on an image within said maximum rectangular region.

6. An apparatus for performing image processing on an image synthesized from a natural image and a computer graphic (CG) image that has a single color, said apparatus comprising:
   a computer processor which executes the following:
   a separation process for dividing said synthesized image into a natural-image region and a CG-image region, wherein
   designation is received of a region containing the natural-image region in the synthesized image,
   the designated region is temporarily divided into the natural-image region and the CG-image region by extracting from the designated region pixels that have the same color as the color contained in a region of the synthesized image other than the designated region, wherein
   when a first small region composed of pixels having the same color as the color contained in the region other than the designated region is present in the designated region, if the size of the first small region is greater than or equal to a threshold value, the first small region is extracted from the designated region to be classified as part of the CG-image region, and
   when a second small region composed of pixels having a color different from the color contained in the region other than the designated region is present in the designated region, if the size of the second small region is greater than or equal to the threshold value, the second small region is not extracted from the designated region and is to be classified as part of the natural-image region, and
   said synthesized image is divided into the natural-image region and the CG-image region;
   a parameter computation process for computing an image-processing parameter for said image processing, based on said natural-image region;
   a processing process for acquiring an intermediate image by performing said image processing on said synthesized image, based on said image-processing parameter; and
   a synthesis process for acquiring a processed image by synthesizing said natural-image region contained in said intermediate image and said CG-image region contained in said synthesized image.

7. The apparatus as set forth in claim 6, wherein said synthesis process blurs a boundary portion between said natural-image region and CG-image region contained in said synthesized image and then synthesizes said CG-image region in said synthesized image and said natural-image region in said intermediate image.

8. The apparatus as set forth in claim 6, wherein a read-out process is executed for obtaining said synthesized image by reading out synthesized image data from a storage medium.

9. The apparatus as set forth in claim 6, further comprising a display screen for displaying said divided natural image and CG image.

10. The apparatus as set forth in claim 6, wherein said parameter computation process sets a maximum rectangular region that is inscribed in said natural-image region, and computes said image-processing parameter, based on an image within said maximum rectangular region.

11. A system for performing image processing on an image synthesized from a natural image and a computer graphic (CG) image that has a single color, said system comprising:
   a computer input device configured to receive designation of a region containing a natural-image region in the synthesized image; and
   a computer processor programmed to:
   temporarily divide the designated region into the natural-image region and a CG-image region by extracting from the designated region pixels that have the same color as the color contained in a region of the synthesized image other than the designated region, wherein when a first small region composed of pixels having the same color as the color contained in the region other than the designated region is present in the designated region, if the size of the first small region is greater than or equal to a threshold value, the first small region is extracted from the designated region to be classified as part of the CG-image region, and when a second small region composed of pixels having a color different from the color contained in the region other than the designated region is present in the designated region, if the size of the second small region is greater than or equal to the threshold value, the second small region is not extracted from the designated region and is to be classified as part of the natural-image region, divide said synthesized image into the natural-image region and a CG-image region, compute an image-processing parameter for said image processing, based on said natural-image region, acquire an intermediate image by performing said image processing on said synthesized image, based on said image-processing parameter, and acquire a processed image by synthesizing said natural-image region contained in said intermediate image and said CG-image region contained in said synthesized image.

12. The system as set forth in claim 11, wherein said computer processor employs a procedure of blurring a boundary portion between said natural-image region and CG-image region contained in said synthesized image and then synthesizing said CG-image region in said synthesized image and said natural-image region in said intermediate image.

13. The system as set forth in claim 11, further comprising a device configured to obtain said synthesized image by reading out synthesized image data from a storage medium.

14. The system as set forth in claim 11, further comprising a device configured to display said divided natural image and CG image.

15. The system as set forth in claim 11, wherein said image-processing parameter computation is a procedure of setting a maximum rectangular region that is inscribed in said natural-image region, and computing said image-processing parameter, based on an image within said maximum rectangular region.

16. A computer readable recording medium having recorded therein a program for causing a computer to execute a method of performing image processing on an image synthesized from a natural image and a computer graphic (CG) image that has a single color, said program comprising:

a procedure of receiving designation of a region containing a natural-image region in the synthesized image;

a procedure of temporarily dividing the designated region into the natural-image region and a CG-image region by extracting from the designated region pixels that have the same color as the color contained in a region of the synthesized image, other than the designated region; wherein when a first small region composed of pixels having the same color as the color contained in the region other than the designated region is present in the designated region if the size of the first small region is greater than or equal to a threshold value, the first small region is extracted from the designated region to be classified as part of the CG-image region, and when a second small region composed of pixels having a color different from the color contained in the region other than the designated region is present in the designated region if the size of the second small region is greater than or equal to the threshold value, the second small region is not extracted from the designated region and is to be classified as part of the natural-image region;

a procedure of dividing said synthesized image into the natural-image region and the CG-image region;

a procedure of computing an image-processing parameter for said image processing, based on said natural-image region;

a procedure of acquiring an intermediate image by performing said image processing on said synthesized image, based on said image-processing parameter; and a procedure of acquiring a processed image by synthesizing said natural-image region contained in said intermediate image and said CG-image region contained in said synthesized image.

17. The computer readable recording medium as set forth in claim 16, wherein said synthesis procedure is a procedure of blurting a boundary portion between said natural-image region and CG-image region contained in said synthesized image and then synthesizing said CG-image region in said synthesized image and said natural-image region in said intermediate image.

18. The computer readable recording medium as set forth in claim 16, wherein the program further comprises a procedure of obtaining said synthesized image by reading out synthesized image data from a storage medium.

19. The computer readable recording medium as set forth in claim 16, wherein the program further comprises a procedure of displaying said divided natural image and CG image.

20. The computer readable recording medium as set forth in claim 16, wherein said parameter computation procedure is a procedure of setting a maximum rectangular region that is inscribed in said natural-image region, and computing said image-processing parameter, based on an image within said maximum rectangular region.

* * * * *